United States Patent
Murakami

(10) Patent No.: US 9,058,173 B2
(45) Date of Patent: *Jun. 16, 2015

(54) METHOD FOR CONTROLLING A MOBILE TERMINAL DEVICE BY CALCULATING A CONCURRENCY BASED ON THE CALCULATED CPU UTILIZATION FOR A FOREGROUND OR BACKGROUND OPERATION EXECUTED BY THE DEVICE

(75) Inventor: Takeo Murakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 295 days.

This patent is subject to a terminal disclaimer.

(21) Appl. No.: 13/592,646

(22) Filed: Aug. 23, 2012

(65) Prior Publication Data

US 2013/0103956 A1 Apr. 25, 2013

(30) Foreign Application Priority Data

Oct. 25, 2011 (JP) .................................. 2011-233950

(51) Int. Cl.
| | | |
|---|---|---|
| G06F 1/00 | (2006.01) | |
| G06F 1/32 | (2006.01) | |
| G06F 1/26 | (2006.01) | |
| G06F 9/48 | (2006.01) | |
| G06F 9/50 | (2006.01) | |
| H04W 52/02 | (2009.01) | |

(52) U.S. Cl.
CPC .............. *G06F 1/329* (2013.01); *G06F 1/3203* (2013.01); *G06F 1/26* (2013.01); *G06F 9/4881* (2013.01); *G06F 1/3206* (2013.01); *H04W 52/0251* (2013.01); *G06F 9/505* (2013.01); *Y02B 60/144* (2013.01); *Y02B 60/142* (2013.01)

(58) Field of Classification Search
CPC .. G06F 1/3203; G06F 9/4843; Y02B 60/1217
See application file for complete search history.

(56) References Cited

U.S. PATENT DOCUMENTS

| | | | |
|---|---|---|---|
| 6,711,447 B1 * | 3/2004 | Saeed .............................. | 700/82 |
| 7,680,628 B1 * | 3/2010 | Becker .......................... | 702/186 |
| 2006/0095807 A1 * | 5/2006 | Grochowski et al. ......... | 713/324 |
| 2008/0077815 A1 | 3/2008 | Kanakogi | |
| 2009/0094437 A1 | 4/2009 | Fukuda | |
| 2010/0299541 A1 * | 11/2010 | Ishikawa et al. ............... | 713/300 |
| 2011/0047401 A1 * | 2/2011 | Werner ......................... | 713/500 |
| 2011/0087909 A1 | 4/2011 | Kanakogi | |
| 2011/0219246 A1 | 9/2011 | Arai | |
| 2012/0011389 A1 * | 1/2012 | Driesen et al. ................ | 713/600 |

FOREIGN PATENT DOCUMENTS

| | | |
|---|---|---|
| JP | 2002-328795 | 11/2002 |
| JP | 2007-334782 | 12/2007 |
| JP | 2008-77640 | 4/2008 |
| JP | 2008-129846 | 6/2008 |
| JP | 2009-21744 | 1/2009 |
| JP | 2009-93383 | 4/2009 |
| JP | 2011-186531 | 9/2011 |

OTHER PUBLICATIONS

Japanese Office Action issued Mar. 3, 2015 in corresponding Japanese Patent Application No. 2011-233950 partial.

* cited by examiner

*Primary Examiner* — Jaweed A Abbaszadeh
*Assistant Examiner* — Gayathri Sampath
(74) *Attorney, Agent, or Firm* — Staas & Halsey LLP

(57) ABSTRACT

A method for controlling a mobile terminal device that includes a multi-core CPU and a display that displays an execution result of an application program executed by the multi-core CPU includes detecting an application program of which an execution result is displayed, calculating a CPU load per thread in the application program detected in the detecting, and increasing the number of cores operating in the multi-core CPU when the number of threads, each of the threads causing the CPU load to be equal to or higher than a first value, is equal to or higher than a second value.

5 Claims, 13 Drawing Sheets

FIG. 7

| CONTROL METHOD | AVERAGE CURRENT TO BE CONSUMED (mA) | DURATION OF BATTERY (h) | IMPROVED VALUE OF DURATION OF BATTERY (h) | IMPROVEMENT RATE (%) |
|---|---|---|---|---|
| CONVENTIONAL CONTROL | 27.0 | 55.6 | | |
| CONCURRENCY MONITORING, CONTROL OF NUMBER OF OPERATING CORES | 24.3 | 61.7 | 6.1 | 11.0 |
| CONCURRENCY MONITORING, CONTROL OF NUMBER OF OPERATING CORES + NARROWING DOWN OF THREADS | 24.0 | 62.5 | 6.9 | 12.4 |

| 502 | 504 | 506 |
|---|---|---|
| OPERATING FREQUENCY | OPERATING VOLTAGE | RELATIVE VALUE OF POWER TO BE CONSUMED |
| 1GHz | 1.1V | 1.0 |
| 550MHz | 0.8V | 0.29 |

| OPERATING FREQUENCY (502) | SINGLE-CORE OPERATION (508) | DUAL-CORE OPERATION (510) |
|---|---|---|
| 1GHz | 343.75mA | 687.5mA |
| 550MHz | 100mA | 200mA |

| OPERATING FREQUENCY ⌠502 | SINGLE-CORE OPERATION ⌠508 | DUAL-CORE OPERATION ⌠510 |
|---|---|---|
| 1GHz | 50% | 10% |
| 550MHz | 30% | 10% |

METHOD FOR CONTROLLING A MOBILE TERMINAL DEVICE BY CALCULATING A CONCURRENCY BASED ON THE CALCULATED CPU UTILIZATION FOR A FOREGROUND OR BACKGROUND OPERATION EXECUTED BY THE DEVICE

CROSS-REFERENCE TO RELATED APPLICATION

This application is based upon and claims the benefit of priority of the prior Japanese Patent Application No. 2011-233950, filed on Oct. 25, 2011, the entire contents of which are incorporated herein by reference.

FIELD

The embodiment discussed herein is related to a method for controlling a mobile terminal device, a medium for storing a control program, and a mobile terminal device.

BACKGROUND

Functions and performance, which are requested for mobile terminal devices, are being upgraded from year to year. Mobile terminal devices, which are called smart phones that are provided with a larger liquid crystal display screen or touch panel than conventional mobile terminal devices and various devices such as a camera and a global positioning system (GPS), are starting to be widely used. Such mobile terminal devices have preinstalled applications for phone calls, mails, web browsing and the like. Users can install various applications in the mobile terminal devices. Multiple applications can be simultaneously executed in each of the mobile terminal devices. The multifunctional mobile terminal devices tend to consume more power than the conventional mobile terminal devices. Power that can be supplied from batteries included in the mobile terminal devices, however, is limited. Thus, there is a demand to reduce power to be consumed in order to drive the mobile terminal devices with the batteries for a long time.

In order to achieve such performance and satisfy the demand to reduce power to be consumed, mobile terminal devices that each include a multi-core central processing unit (CPU) are starting to be widely used. The multi-core CPU can operate in a plurality of frequency-voltage combinations. The multi-core CPU controls its operating speed and power (to be consumed) by dynamically switching between the frequency-voltage combinations. Each of cores of the multi-core CPU can be set to operate or not to operate so that the number of operating cores is increased or reduced. Thus, the whole throughput of the multi-core CPU and power to be consumed by the multi-core CPU can be adjusted. Various applications are executed in the mobile terminal device. The state of the multi-core CPU is dynamically controlled on the basis of the characteristic and usage status of the multi-core CPU. Thus, operation performance of the multi-core CPU is ensured for a user, and power to be consumed by the multi-core CPU is reduced.

Japanese Laid-open Patent Publication Nos. 2007-334782 and 2008-129846 are examples of related art.

SUMMARY

According to an aspect of the invention, a method for controlling a mobile terminal device that includes a multi-core CPU and a display that displays an execution result of an application program executed by the multi-core CPU includes detecting an application program of which an execution result is displayed, calculating a CPU load per thread in the application program detected in the detecting, and increasing the number of cores operating in the multi-core CPU when the number of threads, each of the threads causing the CPU load to be equal to or higher than a first value, is equal to or higher than a second value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating a table indicating an example of effects obtained when the embodiment is applied;

FIG. 8 is a diagram illustrating a table indicating an example of operating frequencies and operating voltages of any of cores of a multi-core CPU and power to be consumed by the core;

FIG. 9 is a diagram illustrating a table indicating currents that are consumed in power states of the multi-core CPU during execution of an application for a smart phone;

FIG. 10 is a diagram illustrating a table indicating an example of ratios of periods of time when a CPU is in power states in a conventional technique;

DESCRIPTION OF EMBODIMENT

In general, usage statuses of all applications are detected in order to dynamically control the aforementioned multi-core CPU. However, a large amount of power is consumed in order to detect the usage statuses of all the applications. It is considered that the usage statuses of certain applications among the applications are detected. In this case, the frequencies of use of the certain applications are not detected. Thus, the usage status of the multi-core CPU is not detected only by selecting the certain applications.

Hereinafter, a mobile terminal device 100 according to an embodiment is described.

Figure 1:
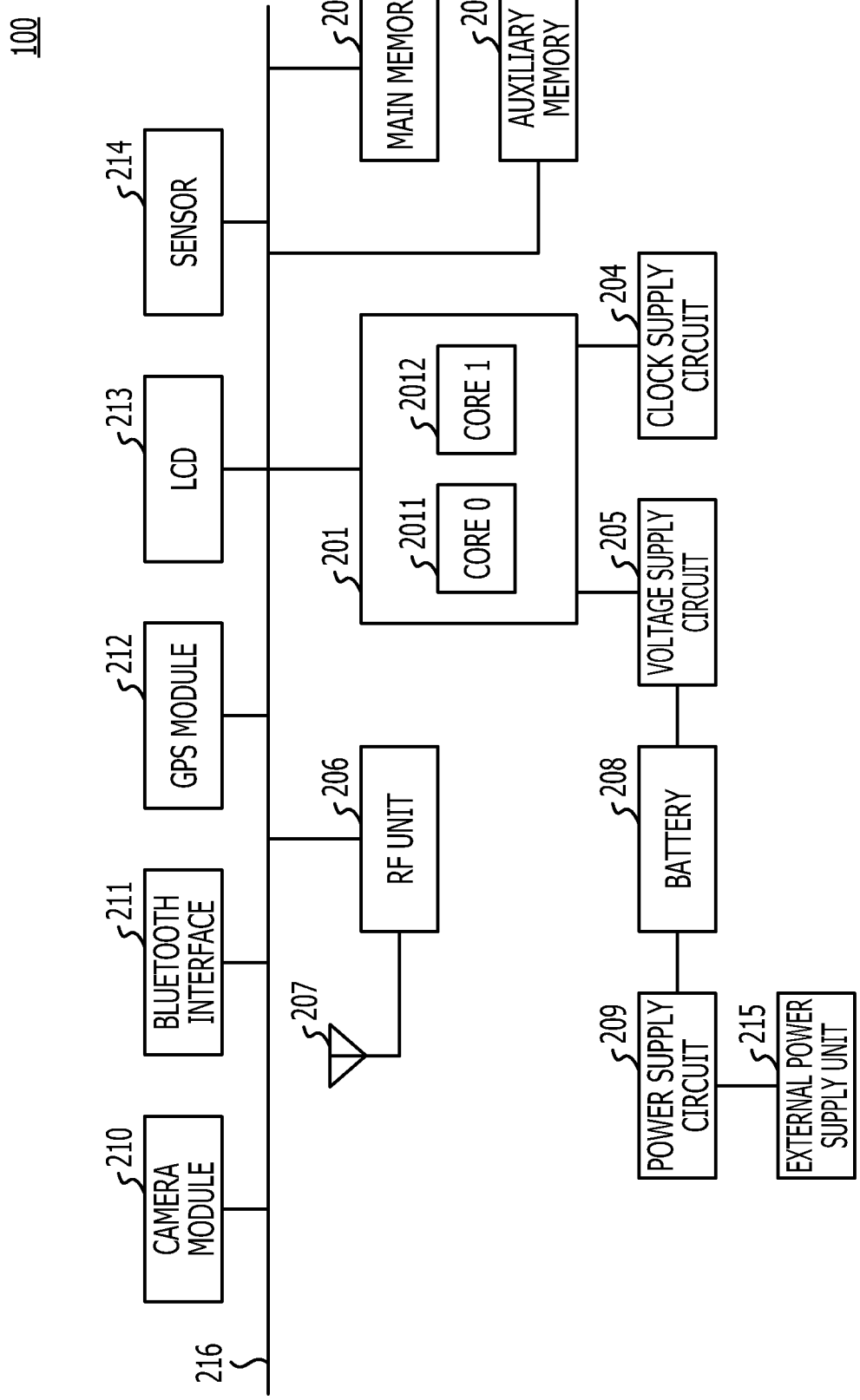
FIG. 1 is a diagram illustrating a hardware configuration of a mobile terminal device according to an embodiment.

FIG. 1 is a diagram illustrating a hardware configuration of the mobile terminal device 100 according to the embodiment. The mobile terminal device 100 illustrated in FIG. 1 is a mobile information terminal such as a smart phone or a tablet personal computer (PC), for example.

The mobile terminal device 100 includes a central processing unit (CPU) 201, a main memory 202, an auxiliary memory 203, a clock supply circuit 204, a voltage supply circuit 205, a radio frequency (RF) unit 206, an antenna 207 and a battery 208 as hardware modules. The mobile terminal device 100 further includes a power supply circuit 209, a camera module 210, a Bluetooth interface 211, a GPS module 212, a liquid crystal display (LCD) 213, a sensor 214 and an external power supply unit 215 as hardware modules. The hardware modules are connected to each other through a bus 216, for example.

The CPU 201 controls the whole mobile terminal device 100. The CPU 201 has a "core 0" 2011 and a "core 1" 2012. The CPU 201 operates on the basis of a clock signal supplied from the clock supply circuit 204 and a voltage supplied from the voltage supply circuit 205. The embodiment describes that the CPU 201 is a dual-core CPU. The CPU 201, however, may have an arbitrary number of cores, for example, may be a quad-core CPU.

The main memory 202 is, for example, a random access memory (RAM). The main memory 202 is used as a work area of the CPU 201.

The auxiliary memory 203 is a nonvolatile memory such as a flash memory. The auxiliary memory 203 stores various programs such as an operating system (OS) to be used to operate the mobile terminal device 100. The programs stored in the auxiliary memory 203 are loaded into the main memory 202 and executed by the CPU 201. By causing the CPU 201 to execute the programs, various programs (described later) are executed in the mobile terminal device 100.

The clock supply circuit 204 supplies a frequency-variable clock signal to the CPU 201. The clock supply circuit 204 can be achieved by a crystal oscillator for oscillating the clock signal or a real time clock (RTC). The voltage supply circuit 205 uses power supplied form the power supply circuit 209 and thereby supplies a variable voltage to the CPU 201. The voltage supply circuit 205 can be achieved by a voltage detector and a voltage regulator, or the like.

The RF unit 206 has a function of transmitting a high-frequency signal from the antenna 207 to another wireless communication device. The RF unit 206 is controlled by the CPU 201 and thereby transmits the high-frequency signal. The RF unit 206 has a function of converting a high-frequency signal received by the antenna 207 into a baseband signal and outputting the baseband signal to the CPU 201.

The battery 208 supplies power to the power supply circuit 209. The battery 208 can be achieved by a battery such as a lithium ion battery and an integrated circuit (IC) for protecting the battery, or the like. The power supply circuit 209 supplies the power supplied from the battery 208 to the hardware modules of the mobile terminal device 100 through a power supply line (not illustrated). When the external power supply unit 215 is connected to an external power supply, the power supply circuit 209 may supply power supplied from the external power supply unit 215 to the hardware modules of the mobile terminal device 100. The power supply circuit 209 can be achieved by a switching regulator and a voltage regulator, or the like.

The camera module 210 is controlled by the CPU 201, thereby images an object and acquires video image data obtained by imaging the object. The Bluetooth interface 211 is a communication interface that is controlled by the CPU 201 and thereby uses Bluetooth (registered trademark) to perform wireless communication with the other wireless communication device. The mobile terminal device 100 may include both Bluetooth interface 211 and a wireless communication interface such as a local area network (LAN) interface.

The GPS module 212 is controlled by the CPU 201, thereby receives a radio wave emitted by a satellite and acquires positional information indicating the current position of the mobile terminal device 100 on the earth.

The LCD 213 is an image display device that is controlled by the CPU 201 and thereby displays an image for a user. The LCD 213 may be a touch panel that has a touch pad with a function of receiving positional information.

The sensor 214 is controlled by the CPU 201 and thereby acquires information indicating each of the states of internal portions of the mobile terminal devices 100. The sensor 214 may be an acceleration sensor, a gyrosensor, an illuminance sensor, a geomagnetic sensor, an inclination sensor, a pressure sensor, a proximity sensor, a temperature sensor or the like.

Figure 2:
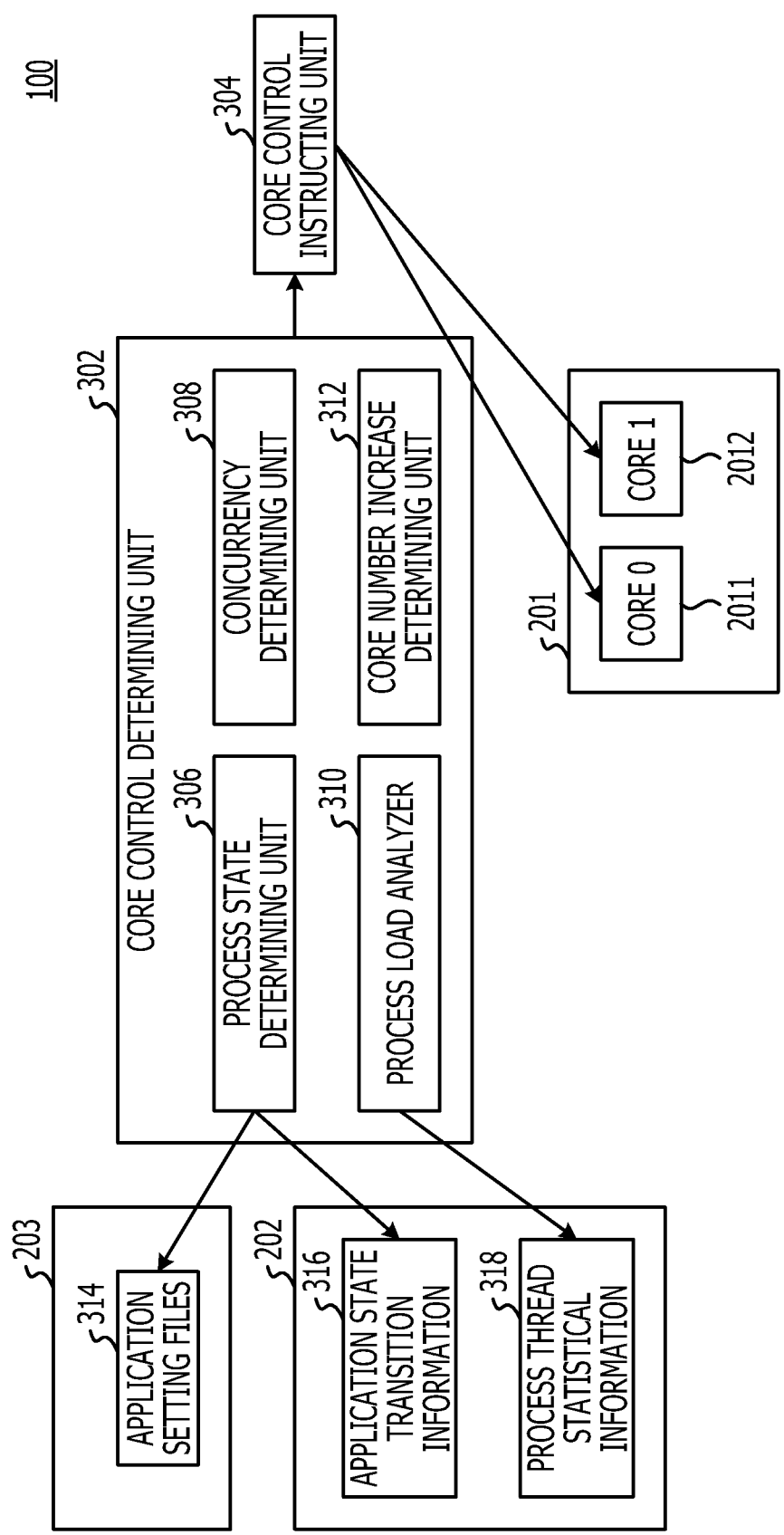
FIG. 2 is a diagram illustrating the mobile terminal device according to the embodiment.

FIG. 2 is a diagram illustrating the mobile terminal device 100 according to the embodiment. Blocks illustrated in FIG. 2 are achieved by causing the CPU 201 of the mobile terminal device 100 to execute the various programs stored in the auxiliary memory 203.

The mobile terminal device 100 includes a core control determining unit 302, a core control instructing unit 304, the main memory 202, the auxiliary memory 203 and the CPU 201.

The core control determining unit 302 periodically monitors an operating state of a system, and determines whether to change power states of the cores of the CPU 201. The core control determining unit 302 transmits the result of the determination to the core control instructing unit 304. The core control determining unit 302 includes a process state determining unit 306, a process load analyzer 310, a concurrency determining unit 308 and a core number increase determining unit 312.

The process state determining unit 306 references application setting files 314 and application state transition information 316, narrows down processes that are being executed to a process related to a foreground operation, and determines a load caused by the process as a load to be measured. The application setting files 314 are information of applications and provided for the applications, respectively. In order to install an application, an application setting file 314 for the application is registered in the auxiliary memory 203, for example. Each of the application setting files 314 has information of a characteristic of an interested application, information of a device to be accessed, and the like. The application state transition information 316 is information indicating whether an application is being executed in the foreground or the background. In the embodiment, a process that is among a plurality of processes that are being executed and of which an execution result is displayed on the LCD 213 is treated as a process related to a foreground operation. In the embodiment, a process other than the process of which the execution result is displayed on the LCD 213 is treated as a process related to a background operation.

The process load analyzer 310 calculates, on the basis of process thread statistical information 318, a CPU utilization per thread in the process that causes the load that is to be measured and has been determined by the process state determining unit 306. The process thread statistical information 318 is information indicating a CPU utilization per thread. For example, the process thread statistical information 318 is generated by the OS. The application state transition information 316 and the process thread statistical information 318 are loaded in the main memory 202.

The concurrency determining unit 308 calculates a concurrency of the interested process on the basis of the CPU utilization that has been calculated for each of the threads by the process load analyzer 310. The concurrency is described later.

The core number increase determining unit 312 determines, on the basis of the concurrency calculated by the concurrency determining unit 308, whether to perform power control so as to change a frequency or voltage of at least one of the cores of the CPU 201 or change the number of cores that operate in the CPU 201.

The core control instructing unit 304 receives the result of the determination of the power control from the core control determining unit 302, issues, to the cores of the CPU 201, a command to change a frequency or voltage of at least one of the cores of the CPU 201 or a command to turn on or off the cores, and thereby changes the power states of the cores.

When a system load increases, the concurrency determining unit 308 calculates a concurrency of an application that is being executed in the foreground. Then, the core number increase determining unit 312 determines whether to increase the number of operating cores on the basis of the concurrency calculated by the concurrency determining unit 308.

The process state determining unit 306 specifies, on the basis of smart phone-specific application state transition information 316, a process that is being executed in the foreground. The process state determining unit 306 checks a CPU load caused by the specified process. The process state determining unit 306 determines, on the basis of a smart phone-specific application setting file 314, whether or not a service that is not executed in the foreground (or on a user interface (UI) screen) and is being executed in the background exists. The process state determining unit 306 specifies a process that is being executed in parallel with the aforementioned process. When the process state determining unit 306 determines that the process that is being executed in parallel with the aforementioned process exists, the process state determining unit 306 checks a CPU load per thread in the process.

The number of threads that cause the CPU loads to be equal to or higher than a threshold is a concurrency. When the concurrency is larger than a threshold, the core control instructing unit 304 increases the number of cores that operate in the CPU 201. When the concurrency is smaller than the threshold, the core control instructing unit 304 increases a frequency of an operating core of the CPU 201 for the increase in the load, instead of increasing the number of cores that operate in the CPU 201.

When a system utilization that is not related to applications executed in foreground operations is equal to or higher than a certain load, the core control instructing unit 304 determines whether to increase the umber of cores that operate in the CPU 201. When a concurrency of an application executed in a foreground operation is low, and a CPU load caused by a background operation other than the application executed in the foreground operation is equal to or higher than the threshold, the core control instructing unit 304 increases the number of cores that operate in the CPU 201.

As an example of the embodiment, a power control process that is performed by the mobile terminal device (smart phone) provided with the two cores is described below.

Figure 3:
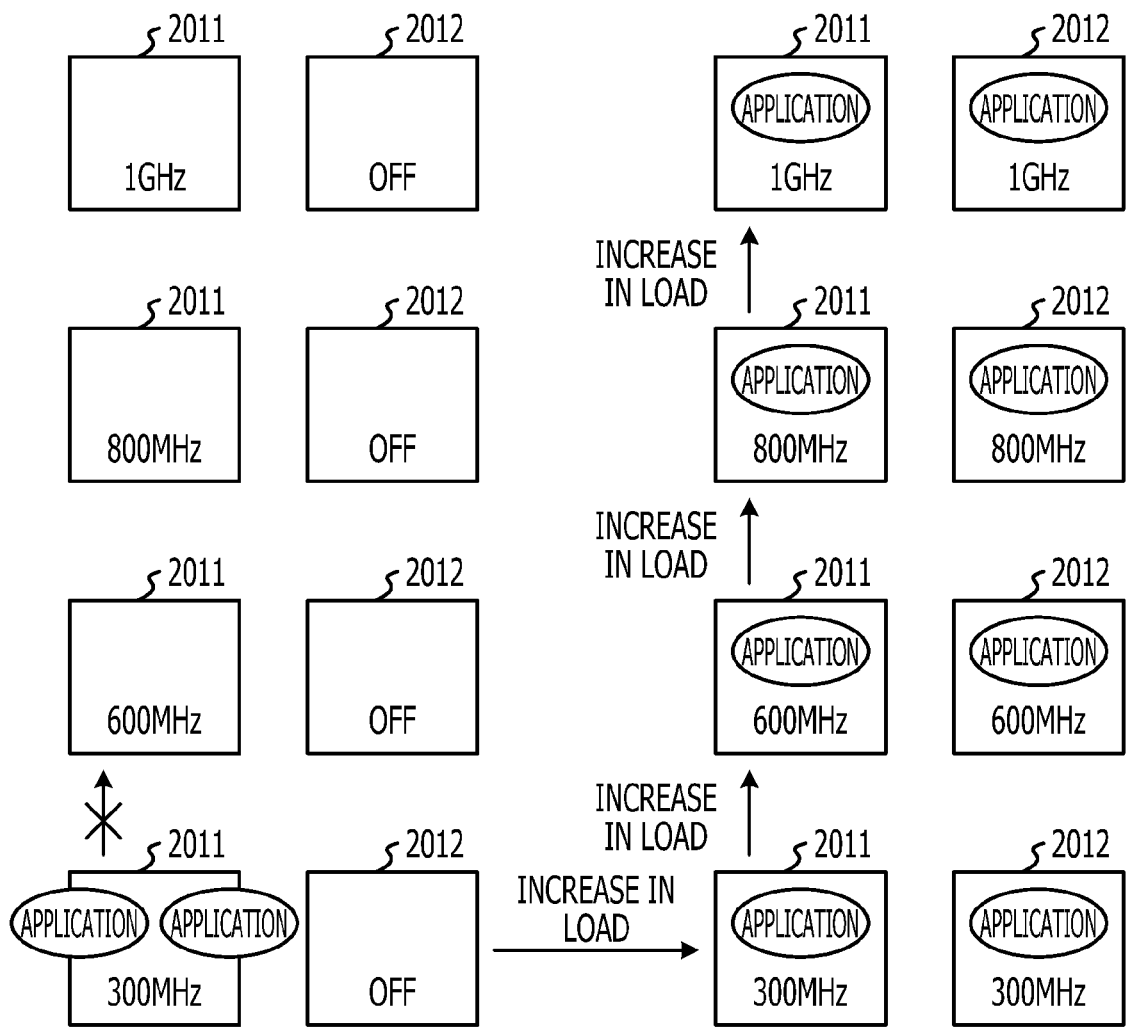
FIG. 3 is a diagram illustrating a first example of a power control process that is performed by the mobile terminal device.

FIG. 3 illustrates a transition of the power states of the cores when a concurrency of an application executed in the foreground in the mobile terminal device 100 is 2 and a load increases.

When one of the cores of the CPU operates at a frequency of 300 MHz, and the concurrency determining unit 308 determines that the concurrency of the application executed in the foreground is 2 or higher, the core control instructing unit 308 increases the number of cores operating in the CPU 201 for the increase in the load and causes the two cores to operate at the frequency of 300 MHz. The total throughput of the two cores operating at the frequency of 300 MHz is equal to the throughput of one core operating at a frequency of 600 MHz in the CPU 201. Power to be consumed by the two cores operating at the frequency of 300 MHz is lower than power to be consumed by the one core operating at the frequency of 600 MHz in the CPU 201. Thus, it is possible to reduce power to be consumed by the two cores operating at the frequency of 300 MHz, compared with the one core operating at the frequency of 600 MHz.

Figure 4:
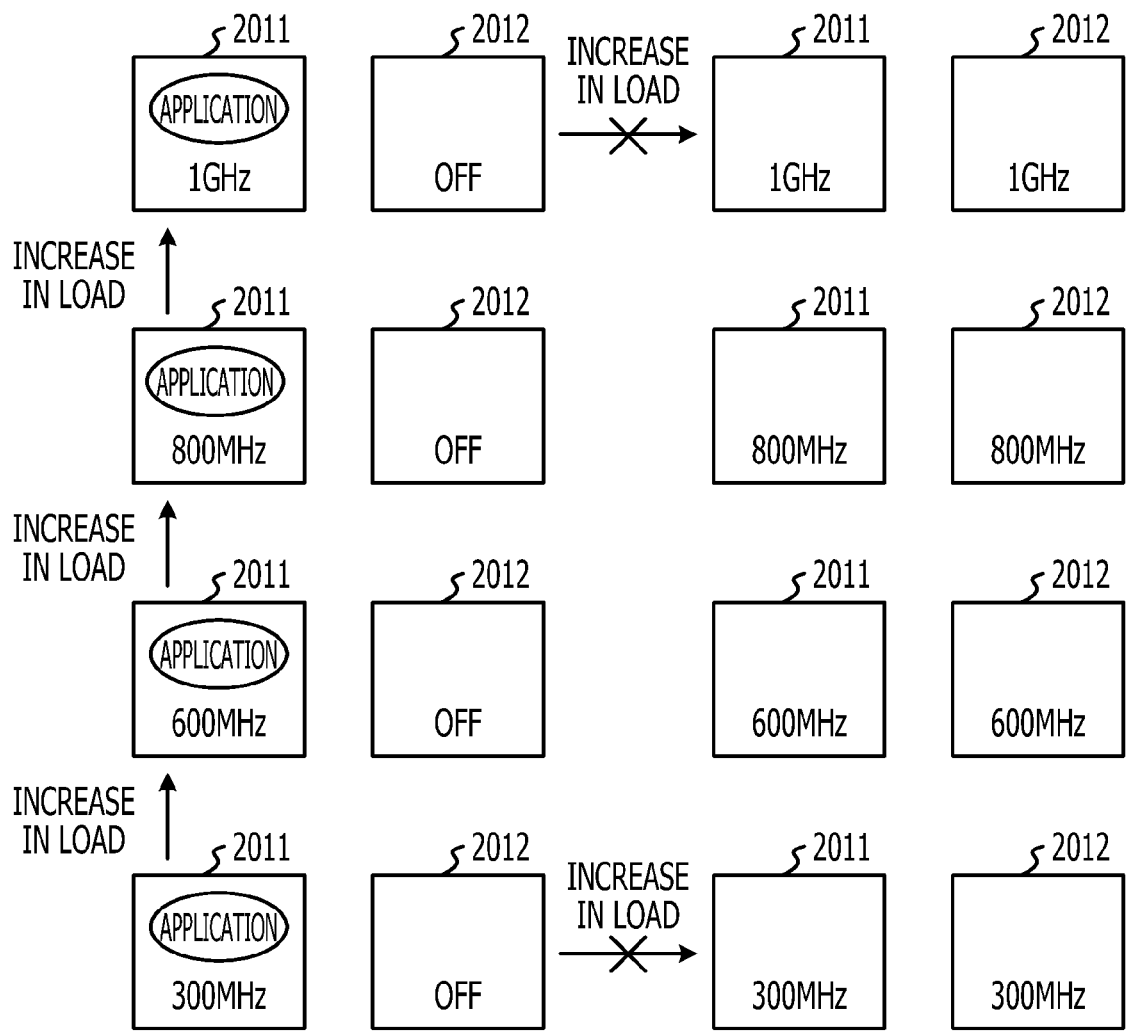
FIG. 4 is a diagram illustrating a second example of the power control process that is performed by the mobile terminal device.

FIG. 4 illustrates a transition of the power states of the cores when the concurrency of the application executed in the foreground in the mobile terminal device 100 is 1 and a load increases.

When one of the cores of the CPU 201 operates at the frequency of 300 MHz, and the concurrency determining unit 308 determines that the concurrency of the application executed in the foreground is 1, the core control instructing unit 304 causes the core to operate at a frequency of 600 MHz to 1 GHz for the increase in the load. This is due to the fact that when the concurrency is 1, and the number of cores operating in the CPU 201 is increased, the one of the cores is not used and useless power is consumed.

Figure 5:
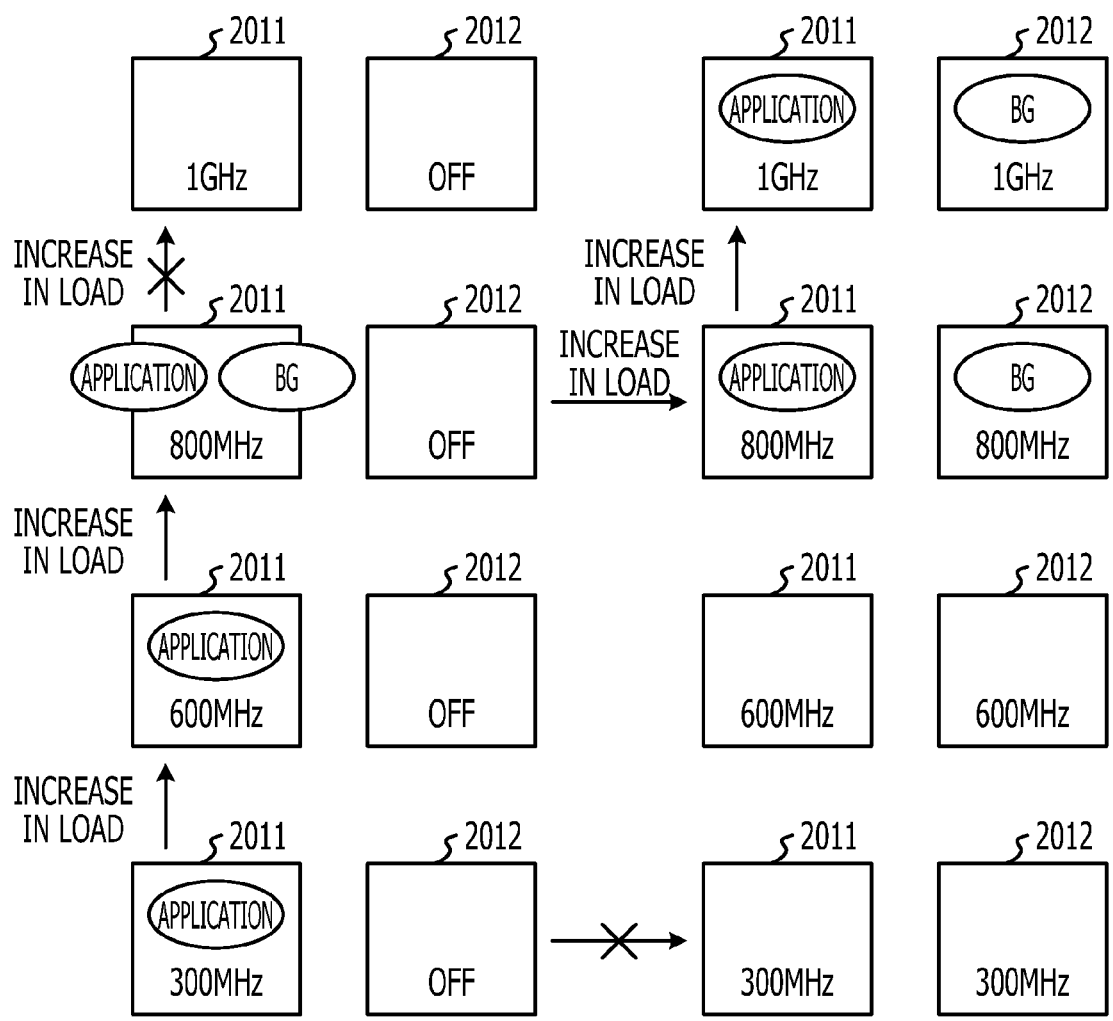
FIG. 5 is a diagram illustrating a third example of the power control process that is performed by the mobile terminal device.

FIG. 5 illustrates a transition of the power states of the cores when the concurrency of the application executed in the foreground in the mobile terminal device 100 is 1, a load increases due to the application and further increases due to a load caused by a background process other than the application during the execution of the application. When one of the cores of the CPU 201 operates at a frequency of 300 MHz, and the concurrency determining unit 308 determines that the concurrency of the application executed in the foreground is 1, the core control instructing unit 304 causes the core to operate at a frequency of 600 MHz to 800 MHz for the increase in the load. When the load other than the load caused by the application executed in the foreground increases during the execution of the application, the plurality of cores can be used to execute the application in the foreground and a background process. Thus, the number of cores that operate in the CPU 201 is increased and whereby the two cores operate.

Figure 6:
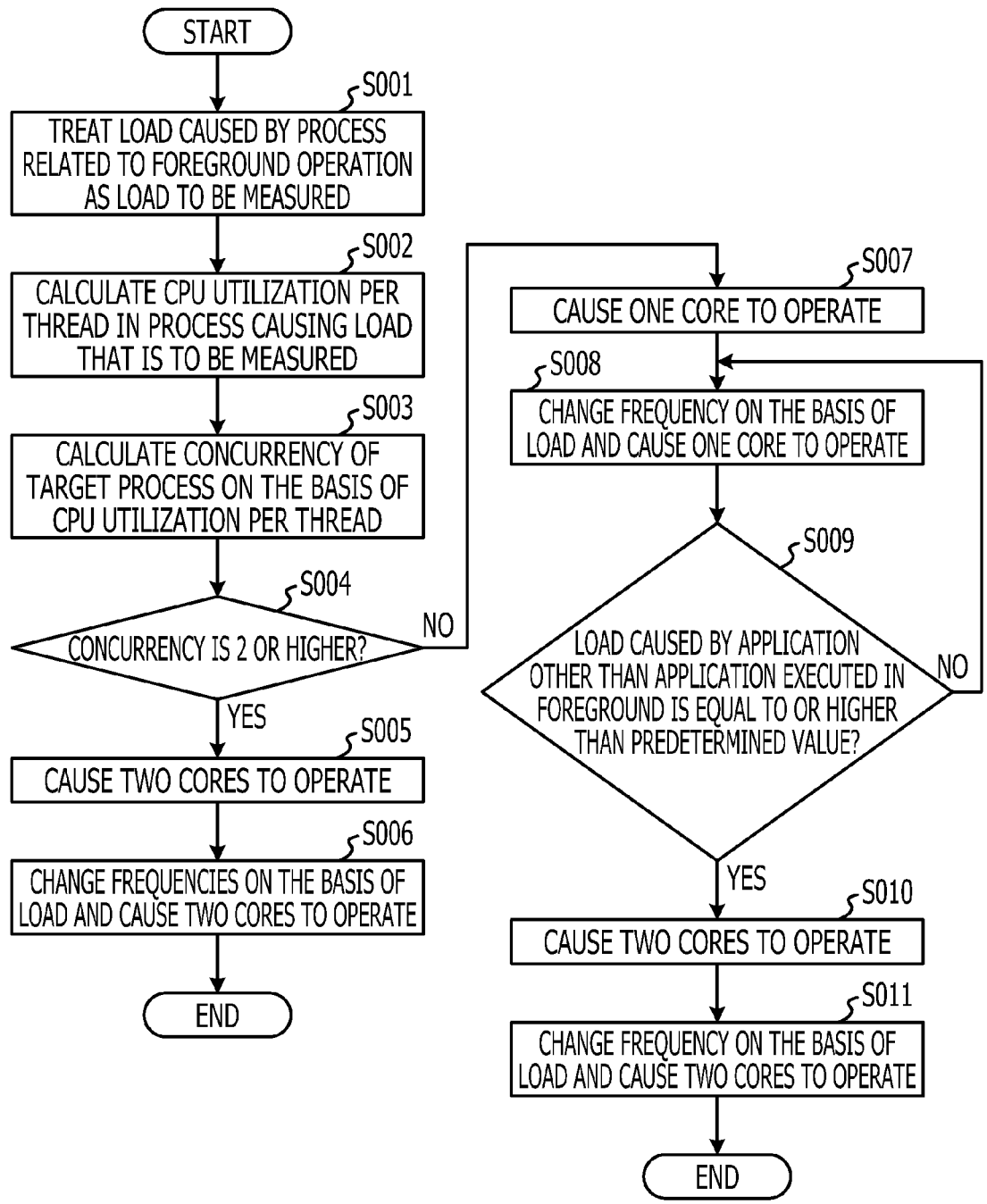
FIG. 6 is a flowchart of a process that is performed by the mobile terminal device.

A process that is performed by the mobile terminal device 100 according to the embodiment is described with reference to FIG. 6.

In S001, the process state determining unit 306 treats a load caused by a target process related to a foreground operation as a load to be measured. The process state determining unit 306 causes the process to proceed to S002.

In S002, the process load analyzer 310 calculates a CPU utilization per thread in the target process causing the load that is to be measured. The process load analyzer 310 causes the process to proceed to S003.

In S003, the concurrency determining unit 308 calculates a concurrency of the target process on the basis of the CPU utilization per thread. The concurrency determining unit 308 causes the process to proceed to S004.

In S004, the core number increase determining unit 312 determines whether or not the concurrency calculated in S003 is 2 or more. When the concurrency calculated in S003 is 2 or more, the core number increase determining unit 312 causes the process to proceed to S005.

In S005, the core control instructing unit 304 causes the two cores of the mobile terminal device 100 to operate. The core control instructing unit 304 causes the process to proceed to S006.

In S006, the core control instructing unit 304 changes the frequencies of the two cores on the basis of the load and causes the two cores to operate in the mobile terminal device 100. The core control instructing unit 304 terminates the process.

When the concurrency calculated in S003 is smaller than 2 in S004, the core number increase determining unit 312 causes the process to proceed to S007.

In S007, the core control instructing unit 304 causes one of the cores to operate in the mobile terminal device 100. The core control instructing unit 304 causes the process to proceed to S008.

In S008, the core control instructing unit 304 changes the frequency of the core on the basis of the load and causes the core to operate in the mobile terminal device 100. The core control instructing unit 304 causes the process to proceed to S009.

In S009, the process load analyzer 310 determines whether or not a load caused by an application other than the application executed in the foreground is equal to or higher than a predetermined value. When the load caused by the application other than the application executed in the foreground is equal to or higher than the predetermined value, the process load analyzer 310 causes the process to proceed to S010. When the load caused by the application other than the application executed in the foreground is lower than the predetermined value, the process load analyzer 310 causes the process to return to S008.

In S010, the core control instructing unit 304 causes the two cores to operate in the mobile terminal device 100. The core control instructing unit 304 causes the process to proceed to S011.

In S011, the core control instructing unit 304 changes the frequencies of the cores on the basis of the load and causes the two cores to operate in the mobile terminal device 100. The core control instructing unit 304 terminates the process.

FIG. 7 illustrates an example of an effect obtained when the embodiment is applied. A table 400 includes an item 402 for control methods, an item 404 for average currents to be consumed, an item 406 for durations of the battery, an item 408 for improved values of the durations of the battery and an item 410 for improvement rates. It is assumed that the user uses the mobile terminal device 100 to execute a smart phone application for two hours in each of days and sets the mobile terminal device 100 to be in a standby mode for the remaining time (of 22 hours) in each of the days. Based on this assumption, durations of the battery are estimated. In addition, it is assumed that the average current to be consumed when the mobile terminal device 100 is in the standby mode is 3 mA and the capacity of the battery is 1500 mAh. Two effects can be obtained in the embodiment. One of the effects is an effect of reducing power (to be consumed) by monitoring a concurrency and controlling the number of operating cores. The other effect is an effect of reducing power (to be consumed) by narrowing down measurement processes to be performed during the monitoring of the concurrency. The two effects are described below.

FIG. 8 illustrates an example of operating frequencies and operating voltages of any of the cores of the CPU 201 included in the mobile terminal device 100 and power to be consumed by the core of the CPU 201. An operating frequency (f) and operating voltage (V) of the core and power (P) to be consumed by the core have a relationship of $P=\alpha \cdot f \ast V^2$, where $\alpha$ is a certain value. A table 500 includes an item 502 for operating frequencies, an item 504 for operating voltages and an item 506 for relative values of power to be consumed.

FIG. 9 illustrates currents that are consumed in power states of the CPU 201 during the execution of the smart phone application. A table 600 includes an item 502 for operating frequencies, an item 508 for a single-core operation, and an item 510 for a dual-core operation.

FIG. 10 illustrates an example of ratios of periods of time when a multi-core CPU is in power states in a conventional technique. A table 700 includes an item 502 for operating frequencies, an item 508 for a single-core operation and an item 510 for a dual-core operation. Since the frequency of a core is increased on the basis of an increase in a system load on a priority basis, the ratio of the period of time when the core operates at a high frequency of 1 GHz is increased. When the CPU operates so that the ratio of the period of time when the core operates at the high frequency is a value illustrated in FIG. 10 during execution of the application, and a standby current of 3 mA flows for the remaining time, the average current to be consumed is 27.0 mA.

Figure 11:
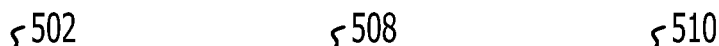
FIG. 11 is a diagram illustrating a table indicating a change in the ratios of periods of time when the multi-core CPU is in power states when concurrency monitoring according to the embodiment and control of the number of operating cores are performed.

FIG. 11 illustrates a change in the ratios of periods of time when the CPU is in power states in the case where the concurrency monitoring according to the embodiment and the control of the number of operating cores are performed, instead of the conventional technique. A table 800 includes an item 502 for operating frequencies, an item 508 for a single-core operation and an item 510 for a dual-core operation. It is assumed that 50% of all applications causes a concurrency to be high (or 2 or more). In the embodiment, when a concurrency is high, the number of operating cores is increased on the basis of an increase in the load on a priority basis. Thus, the ratio of the period of time when the two cores operate at a low frequency is high. When the CPU operates so that the ratio of the period of time when the cores operate at the low frequency is a value illustrated in FIG. 11 during the execution of the application, and a standby current of 3 mA flows for the remaining time, the average current (to be consumed and including an amount (of 3.93 mA (described later)) of an increase in the average current to be consumed for measurements to be performed during the concurrency monitoring) is 24.3 mA. It is assumed that approximately 100 processes are being executed in the smart phone and approximately 700 threads that form the processes are being executed in the smart phone.

In order to measure a load per thread in all the processes that are being executed in the smart phone during the concurrency monitoring, statistical information (execution time) of each of approximately 700 threads of the processes is referenced from task information, differences between the execution times and previously calculated times are calculated, and processes such as a process of calculating a utilization, a process of comparing the utilization with a threshold and a process of incrementing the concurrency are performed. When performance for the processes is estimated from the performance of the CPU, a period of time to measure loads that are caused by all the approximately 700 threads during the concurrency monitoring is 0.457 ms. The average current to be consumed during a process executed by the CPU increases by approximately 86 mA, compared with the time period during idling. Thus, an increase in the average current to be consumed when loads caused by the threads are measured at time intervals of 10 ms during the concurrency monitoring is 86*0.457/10=3.93 mA.

Figure 12:
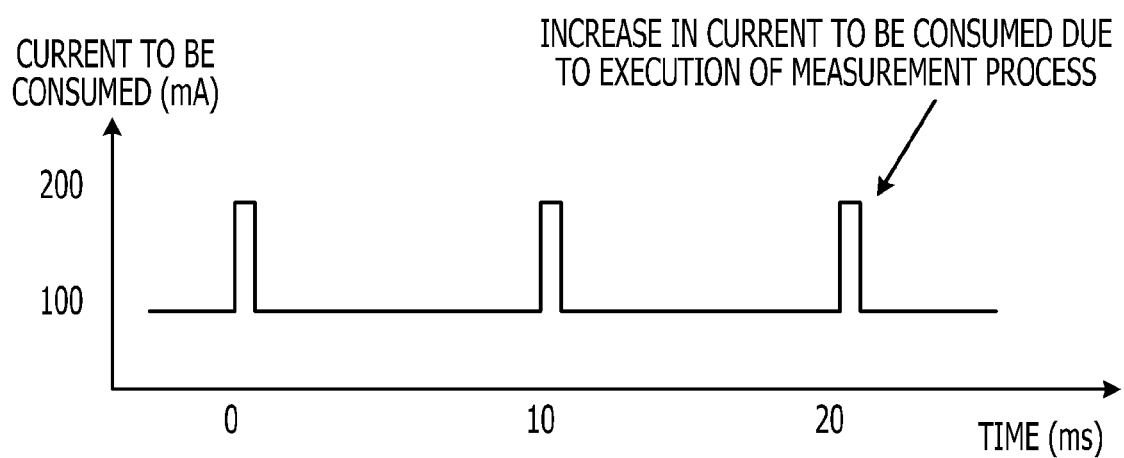
FIG. 12 is a diagram illustrating an effect of reducing power that is to be consumed and is related to the concurrency monitoring when the concurrency monitoring and the control of the number of operating cores are performed.
Figure 13:
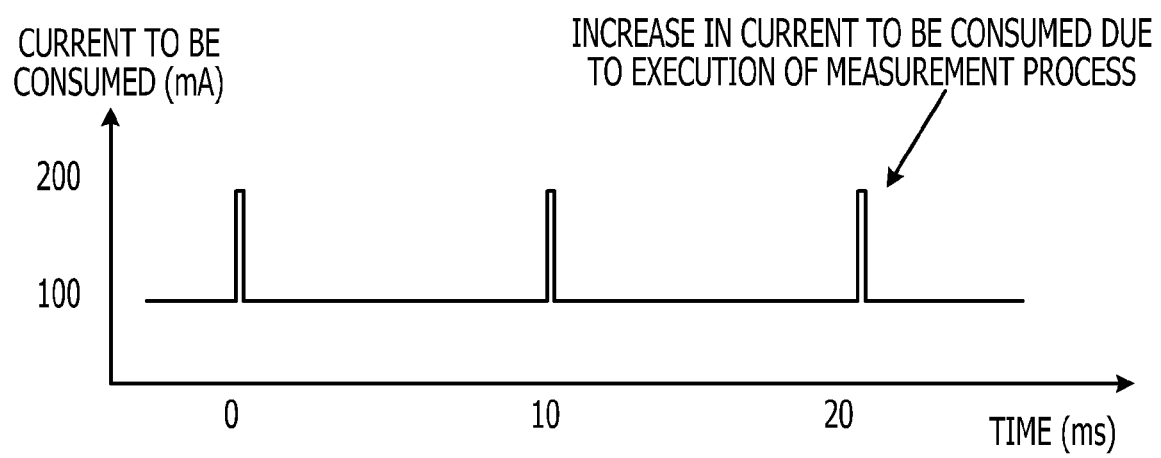
FIG. 13 is a diagram illustrating an effect of reducing power that is to be consumed and is related to the concurrency monitoring when the concurrency monitoring, the control of the number of operating cores and narrowing down of threads to threads to be measured are performed.

In the embodiment, when the processes are narrowed down to processes related to applications executed in the foreground, and the process of measuring loads is performed, the number of the processes can be reduced. In the above description, the number of processes related to applications executed in the foreground is 3, the 3 processes are made up of 20 threads, and whereby the reduction effects are estimated. By narrowing down the approximately 700 threads to the 20 threads to be measured, the cost of the measurement to be performed during the concurrency monitoring can be reduced. The increase in the average current to be consumed can be reduced (from 3.93 mA to 0.11 mA (=20/700)) by reducing the time period in which the measurement process is executed, as illustrated in FIGS. 12 and 13. As a result, the average current to be consumed when the concurrency monitoring according to the embodiment, the control of the number of operating cores and the narrowing down of the threads are performed is 24.0 mA.

A duration of the battery is calculated for each of the control methods on the basis of the calculated average current to be consumed. It is apparent that the duration of the battery is improved, compared with the conventional control method. When the concurrency monitoring according to the embodiment and the method for controlling the number of operating cores are used, the duration of the battery can increases by approximately 11% (6.1 hours). When the concurrency monitoring according to the embodiment, the method for controlling the number of operating cores, and the method for narrowing down the threads to threads causing loads to be measured are used, the duration of the battery can increases by approximately 12.4% (6.9 hours).

FIG. 12 illustrates an effect of reducing power (to be consumed) related to the concurrency monitoring when the concurrency monitoring and the method for controlling the number of operating cores are used.

FIG. 13 illustrates an effect of reducing power (to be consumed) related to the concurrency monitoring when the concurrency monitoring, the method for controlling the number of operating cores, and the method for narrowing down the threads to threads causing loads to be measured are used.

The mobile terminal device according to the embodiment is described above. The techniques disclosed herein are not limited to the embodiment. Various changes and modifications can be made without departing from the scope of the appended claims. For example, the core control determining unit 302 and the core control instructing unit 304 may be configured by hardware.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method for controlling a mobile terminal device that includes a multi-core CPU and a display that displays an execution result of an application program executed by the multi-core CPU, the method comprising:
   when an execution result is displayed on the display, determining that an application program performed by the multi-core CPU that causes the execution result to be displayed is a foreground operation;
   calculating a CPU utilization per thread for the foreground operation;
   calculating a concurrency of the foreground operation based on the calculated CPU utilization, the concurrency being a number of threads that cause the CPU utilization to be equal to or larger than a first threshold value;
   when the concurrency is equal to or larger than a second threshold value, increasing a number of cores operating in the multi-core CPU; and
   when the concurrency is smaller than the second threshold value, increasing a frequency of at least one core already operating in the multi-core CPU.

2. The method according to claim 1, further comprising:
   determining that an application program performed by the multi-core CPU that does not cause an execution result to be displayed on the display is a background operation; and
   when the concurrency is smaller than the second threshold value and when a CPU utilization caused by the background operation is equal to or larger than a third threshold value, increasing a number of cores operating in the multi-core CPU.

3. A non-transitory medium for storing a control program to control a mobile terminal device that includes a multi-core CPU and a display that displays an execution result of an application program executed by the multi-core CPU, the control program causing the multi-core CPU to execute a process including:
   when an execution result is displayed on the display, determining that an application program performed by the multi-core CPU that causes the execution result to be displayed is a foreground operation;
   calculating a CPU utilization per thread for the foreground operation;
   calculating a concurrency of the foreground operation based on the calculated CPU utilization, the concurrency being a number of threads that cause the CPU utilization to be equal to or larger than a first threshold value;
   when the concurrency is equal to or larger than a second threshold value, increasing a number of cores operating in the multi-core CPU; and
   when the concurrency is smaller than the second threshold value, increasing a frequency of at least one core already operating in the multi-core CPU.

4. A mobile terminal device including a multi-core CPU and a display that displays an execution result of an application program executed by the multi-core CPU, the device comprising;
   a determining unit that determines, when an execution result is displayed on the display, that an application program performed by the multi-core CPU that causes the execution result to be displayed is a foreground operation;
   an analyzer that calculates a CPU utilization per thread for the foreground operation and calculates a concurrency of the foreground operation based on the calculated CPU utilization, the concurrency being a number of threads that cause the CPU utilization to be equal to or larger than a first threshold value; and an instructing unit that, when the concurrency is equal to or larger than a second threshold value, increases a number of cores operating in the multi-core CPU, and when the concurrency is smaller than the second threshold value, increases a frequency of at least one core already operating in the multi-core CPU.

5. A mobile terminal device comprising:

a multi-core CPU; and a display that displays an execution result of an application program executed by the multi-core CPU, wherein the multi-core CPU executes a process including when an execution result is displayed on the display, determining that an application program performed by the multi-core CPU that causes the execution result to be displayed is a foreground operation;

calculating a CPU utilization per thread for the foreground operation; and calculating a concurrency of the foreground operation based on the calculated CPU utilization, the concurrency being a number of threads that cause the CPU utilization to be equal to or larger than a first threshold value;

when the concurrency is equal to or larger than a second threshold value, increasing a number of cores operating in the multi-core CPU; and when the concurrency is smaller than the second threshold value, increasing a frequency of at least one core already operating in the multi-core CPU.

\* \* \* \* \*